Patented Jan. 4, 1949

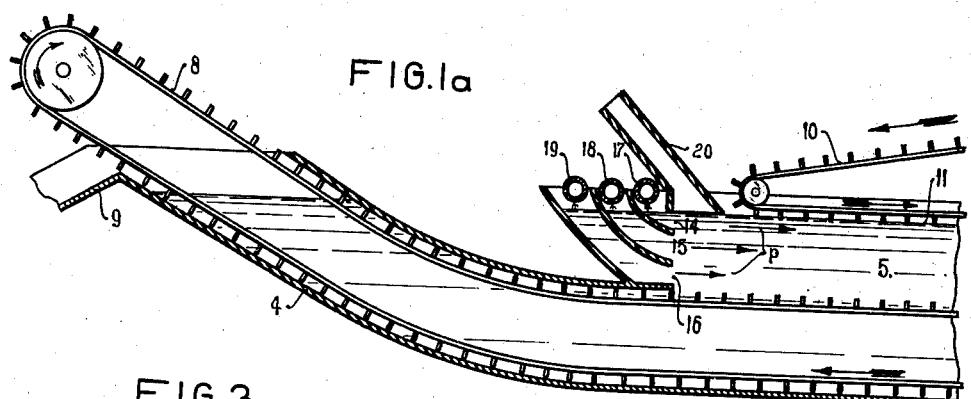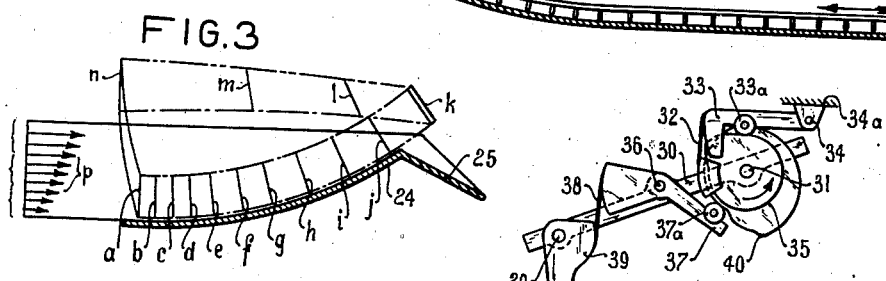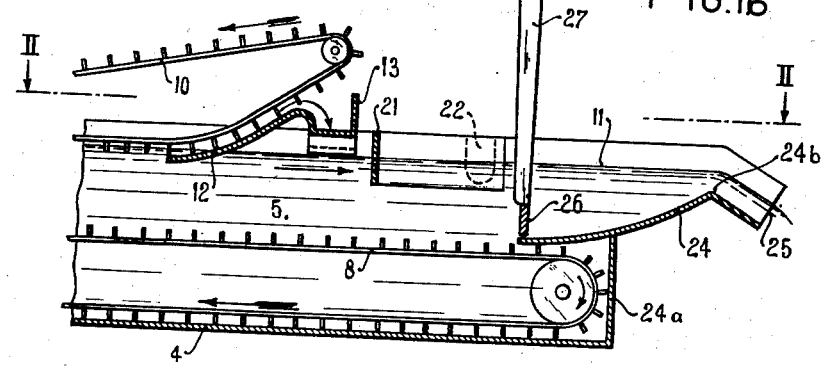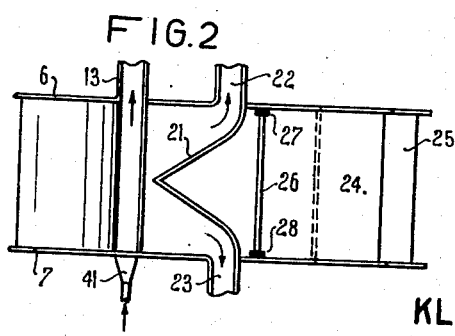

2,458,035

UNITED STATES PATENT OFFICE 2,458,035

GRAVITY LIQUID SEPARATOR

Klaas F. Tromp, Kerkrade, Netherlands, assignor of three-fourths to Domaniale Mijn-Maatschappij N. V., Kerkrade, Netherlands Application September 18, 1945, Serial No. 617,116
In Germany September 5, 1941

Section 1, Public Law 690, August 8, 1946
Patent expires September 5, 1961

3 Claims. (Cl. 209—173)

This invention relates to apparatus for separating, by means of a suspension of "sand" in "water," solid materials having different specific gravities.

Hereinafter the word "water" will be used to mean any liquid suitable for the purpose, and the word "sand" will be used to mean any comminuted insoluble material, for instance magnetite, heavier than the liquid and adapted as the solid constituent of the suspension.

More especially the invention relates to an improvement in apparatus as disclosed by my copending United States patent application Ser. No. 335,078, filed May 14, 1940, now Patent No. 2,365,734, December 26, 1944. Said apparatus comprises a tank for holding a body of suspension of sand in water and provided with means for removing material from the bottom thereof, means for removing material from the surface of said body, means for feeding the materials to be separated into said tank at one side thereof to permit them to respectively seek zone levels corresponding to varying specific gravities of the materials, independent means for introducing suspension at the feed side of the tank and for withdrawing suspension therefrom at the opposite side thereof, said suspension introducing and withdrawing means serving to create a slow moving substantially horizontal current in said tank for conveying materials to be separated thereacross, and means at the said opposite side of the tank for removing material from a level intermediate the bottom of the tank and the surface of the body of suspension.

In accordance with my aforesaid copending specification, the material held in suspension between the top and the bottom level of the bath is removed from the tank by a hydraulic or fluid discharge, i. e. by an upwardly directed flow of liquid.

In practice it has been found that under certain circumstances said fluid discharge is not altogether satisfactory, and the object of my present invention is to substitute it by mechanical means more capable of dealing with relatively large quantities of middlings and less liable to disturb the uniformity of the substantially horizontal flow of the suspension in the tank than the drag conveyor disclosed, for said purpose, in my prior United States specification No. 2,139,047. With this object in view, my invention consists in that the discharge end of the tank is constituted as an upwardly inclined chute, whose upper end is located some distance below the surface of the bath and communicates with a discharge trough, said chute cooperating with an impeller driven in such manner as to be adapted to push middlings through the chute towards the discharge trough, thereupon to be lifted from the bath and to again be dipped thereinto near the inner end of the chute to force another amount of middlings towards said trough, in cyclic succession.

In order that my invention may be fully understood by those skilled in the art, I shall now proceed to describe it with reference to the annexed, more or less diagrammatic drawing, wherein:

Figs. 1a and 1b are longitudinal vertical sectional views of the feed end and of the discharge end, respectively, of a preferred embodiment of my invention, Fig. 2 is a fragmentary plan view of said embodiment, and Fig. 3 is a diagram of the impeller movement.

In Figs. 1a and 1b, the numeral 4 designates the tank holding a body 5 of unstable suspension of sand in water. As shown, the tank is of elongated form and comparatively shallow, its side walls 6 and 7 being substantially parallel and vertical. A drag conveyor 8, driven in clockwise direction and extending through the full length of the tank is mounted in the lower portion thereof, so that its lower part is adapted to sweep the tank bottom and to drag any material lying thereon towards a sloping discharge chute 9. A second drag conveyor 10, driven in anticlockwise direction, is mounted with a portion of its lower part parallel and a certain distance below the level 11 of the body of suspension within the tank, a further portion of said part being parallel and flush with an upwardly inclined chute 12. The lower end of said chute extends downwardly to a small distance below the level 11, its upper end merging, above said level, into a transverse and sloping trough 13.

The left hand or feed side of the tank is provided with three vertically spaced inlet openings 14, 15, 16 for suspension of sand in water fed thereto by conduits 17, 18 and 19, respectively, the materials to be separated being charged into the tank by a chute 20 opening vertically above said inlet openings substantially at the surface of the bath.

The arrows p designate the direction in which the suspension fed to the bath flows from the feed side towards the opposite or discharge side of the tank.

Located beyond the chute 12, as seen in the direction of flow of the suspension, at a level just above that of the upper part of conveyor 8, is the front edge of the aforesaid inclined chute 24, which forms part of the right hand end wall 24a of the tank and extends upwardly to a level some distance below the surface 11 of the bath, its upper end 24b merging into a sloping discharge trough 25 and forming a weir or overflow edge.

The impeller, which cooperates with chute 24 to remove middlings from the bath, is designated by 26. In the position shown in Fig. 1b, it is situated with its lower edge vertically above the front end of chute 24 and at a very small distance above the bottom of the chute. It is formed by a board extending across and through the full width of the chute, and is secured to the lower ends of two suitably spaced rods 27, 28, the upper ends of which are pivoted as at 29 to a lever 30 rotatably mounted on a shaft 31. Arm 30 is suspended from a strap 32 secured to one end of a lever 33, the other end of which is pivoted as at 34 to a fixed part 34a. An antifriction roller 33a mounted to lever 33 is held in engagement, by the gravity of lever 33 and of the parts suspended therefrom, with the circumference of a cam 35 keyed to shaft 31.

Intermediate pivot 29 and shaft 31, the lever 30 carries the pivot 36 of a bell-crank 37, one arm of which is secured by a strap 38, to a short arm 39 of rod 27, the other being provided with an antifriction roller 37a held in engagement, by the gravity of the impeller 26 and of the rods 27, 28, with the circumference of a second cam 40 keyed to shaft 31.

From the drawing it will be understood that, if shaft 31 is rotated in counterclockwise direction at a speed of say 2–3 revolutions per minute, starting from the positions of the various parts as shown, lever 30 will during the greater part of the cycle remain stationary, since roller 33a travels on a concentric portion of its track on cam 35. During said period, roller 37a is slowly pushed away from shaft 31, owing to the radius of cam 40 slightly but progressively increasing. Consequently, the impeller 26 will move towards the right, over chute 24, at a low, progressively increasing speed, until it has reached the discharge end thereof.

At this moment, roller 33a rides up an enlarged portion of restricted angular extent of cam 35, whereby the lever 30 is swung upward and the impeller is rapidly raised from the bath. About simultaneously therewith, roller 37a rides down a first steep slope of cam 40, so that the impeller 27 resumes its substantially vertically depending position, and immediately thereafter roller 33a rides down the aforesaid enlarged portion of cam 35, while roller 37a rides down a second steep slope of cam 40, owing whereto the impeller, notwithstanding the downwardly swinging movement of lever 30, remains substantially vertical while again being dipped into the bath and returning into its initial position. Thereupon the described cycle is repeated.

The apparatus described operates as follows. Assuming run-of-mine coal and suspensions of the required densities to be fed at suitable rates into the bath by chute 20 and by the inlets 14–16, respectively, drag conveyors 8 and 10 to be driven and shaft 31 to rotate at suitable low speeds, it will be understood that the gravimetric separation of the material treated in the tank will take place in substantially the same manner as disclosed by my prior U. S. Patent 2,139,047 and my copending U. S. patent application Serial No. 335,078. That is to say, the pure coal will float, carried by the lower part of conveyor 10 towards chute 12 and dragged thereby into the discharge trough 13. The discharge of the coal from said trough may be promoted by a jet of suspension from pipe 41 shown in Fig. 2.

The middlings, which pass below the front edge of chute 12, enter into the chute 24 and are driven towards the overflow 24b.

As to the slate, this sinks to the bottom, from which it is removed by the conveyor 8.

Fig. 3 diagrammatically illustrates the movement of the impeller 26, successive positions of which during a complete cycle are designated by $a, b, c, \ldots n$, it being understood that all distances from $a$ to $b$, from $b$ to $c$, and from $n$ to $a$ are covered in say one second. In view of the explanation given hereinbefore, it is not necessary to go into a detailed description as far as the operation of the impeller is concerned. I only wish to point out that the speed of the impeller, through the first part of its outward excursion, should be approximately equal to that of the suspension when entering the chute, so that the impeller, while still assuming a substantially vertical position, simply follows the movement of the liquid. That is to say, it allows the liquid on its rear face to continue to flow along substantially horizontal paths, and simultaneously prevents the middlings in front of it from following their tendency to lag behind under the influence, inter alia, of frictional resistance offered by chute 24. As to the liquid between the level of the top edge of the impeller and the surface of the bath, this will practically not at all be interfered with by the impeller, but continue its slow horizontal movement towards the weir 24b, thereby preventing the middlings, which are pushed towards the weir by the impeller, from returning over the top edge of the impeller. Thus, no disturbances are set up in the uniform, horizontal flow of the suspension in the bath on the left hand side of chute 24, and the accuracy of the separation therein is not impaired.

During the last part of its outward stroke, the deviation of the impeller from its vertical position is more appreciable so that the speed of the suspension in the lower portion of the chute will acquire a slight upward inclination. This, however, does not appreciably affect the uniformity of flow in the main portion of the separation tank, especially not as during said part of the outward stroke the impeller is accelerated to keep pace with the flow of the suspension towards the weir 24b, so that said deviation is only of short duration.

The arrows $p$ in Fig. 3 denote that the velocity of flow of the liquid in the tank gradually decreases from top to bottom, i. e. from the speed of the conveyor 10 to that of the conveyor 8. This, however, it not always necessary.

As a matter of course, the suspensions discharged from the tank, after separation from the materials, will be regenerated and recycled. The means therefore, however, have not been illustrated, since they do not form part of my present invention.

What I claim is:

1. Apparatus for separating, by means of a suspension of "sand" in "water," solid materials having different specific gravities, comprising a tank for holding a body of suspension and provided with means for removing material from the bottom thereof, means for removing material from the surface of said body, means for feeding materials to be separated into said tank at one side thereof to permit them to respectively seek zone levels corresponding to their specific gravities, independent means for introducing suspension at the feed side of the tank and for withdrawing suspension therefrom at the opposite side thereof, said suspension introducing and withdrawing means serving to create a slow moving substantially horizontal current in said tank for conveying materials to be separated thereacross, and means at the said opposite side of the tank for removing material from a level intermediate the bottom of the tank and the surface of the body of suspension, wherein the latter means comprise, in addition to an upwardly inclined shoot provided at the discharge end of the tank with its upper end somewhat below the surface of the bath, an impeller element and driving means therefor, said driving means being arranged for imparting cyclic movement to the impeller element in such a manner that said element is first swept in an accelerated movement over said upwardly inclined shoot, thereupon lifted from the body of suspension, and thereupon returned to again be dipped into said body near the lower end of the shoot.

2. Apparatus as claimed in claim 1 and comprising a first lever from which the impeller is flexibly suspended and which is adapted for swinging movement about a fixed axis, a second lever operatively coupled with the first lever and also adapted for swinging movement about a fixed axis, a drive shaft, a cam operatively associated with said shaft and adapted to impart swinging movement to said second lever, a third lever hinged to said first lever and operatively coupled with the impeller, and a second cam operatively associated with said shaft and adapted to impart swinging movement to said third lever.

3. Apparatus as claimed in claim 1, wherein the impeller element has a width substantially equal to that of the shoot and is arranged to sweep without appreciable clearance over the bottom of the shoot.

KLAAS F. TROMP.

REFERENCES CITED

The following references are of record in the file of this patent:

UNITED STATES PATENTS

| Number | Name | Date |
| --- | --- | --- |
| 1,215,345 | Clark | Feb. 13, 1917 |
| 2,139,047 | Tromp | Dec. 6, 1938 |